United States Patent
Chen

(12) 
(10) Patent No.: US 6,355,342 B1
(45) Date of Patent: Mar. 12, 2002

(54) FLASH LAYER OVERCOAT FOR HIGH DENSITY MULTILAYER MAGNETO-OPTICAL MEDIA

(75) Inventor: Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/433,376

(22) Filed: Nov. 3, 1999

Related U.S. Application Data
(60) Provisional application No. 60/109,230, filed on Nov. 18, 1998.

(51) Int. Cl.$^7$ .................................................. G11B 5/66
(52) U.S. Cl. .................... 428/332; 428/336; 428/64.6; 428/694 ML; 428/694 SC; 428/694 MT; 428/694 DE; 428/694 NF; 428/694 MM; 428/900
(58) Field of Search .................. 428/694 ML, 694 SC, 428/694 MT, 694 DE, 694 NF, 694 MM, 64.6, 900, 336, 332

(56) References Cited

U.S. PATENT DOCUMENTS

| | | | | |
|---|---|---|---|---|
| 4,737,408 A | * | 4/1988 | Kuwahara et al. | 428/335 |
| 4,777,068 A | * | 10/1988 | Omata et al. | 428/69 |
| 4,925,733 A | | 5/1990 | Imataki et al. | 428/336 |
| 5,053,288 A | | 10/1991 | Hashimoto et al. | 428/694 AM |
| 5,506,023 A | | 4/1996 | Ohmori et al. | 428/64.3 |
| 5,534,322 A | | 7/1996 | Ueyama et al. | 428/64.2 |
| 5,540,988 A | | 7/1996 | Tachibana et al. | 428/323 |
| 5,576,087 A | | 11/1996 | Watanabe et al. | 428/141 |
| 5,580,633 A | | 12/1996 | Kuwahara et al. | 428/64.3 |
| 5,604,005 A | | 2/1997 | Endo et al. | 428/64.3 |
| 5,618,617 A | | 4/1997 | Uchida et al. | 428/323 |
| 5,633,746 A | | 5/1997 | Sekiya et al. | 359/280 |
| 5,637,393 A | * | 6/1997 | Ueda et al. | 428/332 |
| 5,674,638 A | * | 10/1997 | Grill et al. | 428/694 TC |
| 5,763,071 A | | 6/1998 | Chen et al. | 428/332 |
| 5,776,602 A | | 7/1998 | Ueda et al. | 428/332 |
| 5,786,078 A | | 7/1998 | Sekiya et al. | 428/332 |
| 5,814,418 A | | 9/1998 | Nishikiori et al. | 428/694 ML |
| 5,821,004 A | | 10/1998 | Hino et al. | 428/694 ML |
| 5,824,387 A | | 10/1998 | Boutaghou et al. | 428/65.5 |
| 5,825,723 A | | 10/1998 | Hirokane et al. | 369/13 |
| 5,837,357 A | * | 11/1998 | Matsuo et al. | 428/212 |
| 5,853,871 A | * | 12/1998 | Kitaori et al. | 428/332 |
| 5,858,520 A | * | 1/1999 | Uchiyama | 428/216 |
| 5,858,536 A | | 1/1999 | Yanagisawa | 428/408 |
| 5,914,198 A | | 6/1999 | Miyamoto et al. | 428/694 ML |

\* cited by examiner

*Primary Examiner*—Leszek Kiliman
(74) *Attorney, Agent, or Firm*—McDermott, Will & Emery

(57) ABSTRACT

High density, multi-layer, magneto-optical (HDMMO) information storage and retrieval media having improved tribological properties when used in high-density storage devices employing very small head flying heights are formed by providing an ultra-thin, protective flash layer overcoat (FLO)/lubricant topcoat layer system over the surface of a HDMO medium comprising a metal superlattice. Embodiments of the present invention include forming the FLO layer of an amorphous, abrasion-resistant, carbon-based, diamond-like material not greater than about 10 Å thick and selected from $CN_x$, $CH_x$, and $CN_xH_y$, and providing the lubricant topcoat on the FLO layer as an about 15–25 Å thick layer of a fluoropolyether or perfluoropolyether material, e.g., perfluoropolyethylene (PFPE).

19 Claims, 2 Drawing Sheets

FLASH LAYER OVERCOAT FOR HIGH DENSITY MULTILAYER MAGNETO-OPTICAL MEDIA

CROSS-REFERENCE TO PROVISIONAL APPLICATION

This application claims priority from provisional patent application Serial No. 60/109,230 filed Nov. 18, 1998, the entire disclosure of which is incorporated herein by reference.

CROSS-REFERENCE TO RELATED APPLICATIONS

This application contains subject matter similar to subject matter disclosed in U.S. patent applications: Ser. No. 09/433,377, filed on Nov. 3, 1999 now U.S. Pat. No. 6,268,073, Ser. No. 09/433,375, filed on Nov. 3, 1999 now pending, and Ser. No. 09/433,378, filed on Nov. 3, 1999 now pending.

FIELD OF THE INVENTION

The present invention relates to the recording, storage, and reading of information utilizing high density, multilayer, magneto-optical (HDMMO) media, particularly rotatable MO storage media, such as in the form of thin film disks, and a protective overcoat/lubricant topcoat layer system for contact with cooperating transducer and/or sensor heads or devices.

BACKGROUND OF THE INVENTION

In recent years, much research and development of MO recording media for use as high density/high capacity memory devices has been carried out. Such media typically comprise a suitable substrate, e.g., of glass, polymer, metal, or ceramic material, coated with a perpendicularly magnetizable film used as a recording medium, typically composed of a rare earth/transition metal thermomagnetic (RE-TM) material, e.g., TbFe, TbFeCo, TbDyFeCo, etc. Information is recorded within the medium by switching the direction of magnetization of desired portions (i.e., domains) of the perpendicularly magnetizable film. More specifically, for recording information, the recording medium is first initialized by applying to the medium a magnetic field from an externally positioned magnetic field generation device (i.e., external magnetic bias), thereby making the direction of the perpendicular magnetization uniformly upwardly or downwardly facing. A first laser beam of sufficiently high power or intensity from a suitable source, e.g., a laser diode, is then irradiated on desired recording portions of the recording medium in the presence of an externally applied magnetic bias field. As a consequence of the laser beam irradiation, the temperature of the irradiated portions (domains) of the recording medium rises, and when the temperature reaches or exceeds the Curie point of the vertically magnetizable film or its magnetic compensation point, the coercive force on the recording portion becomes zero or substantially zero. When this state is achieved at the desired recording portions of the medium, and in the presence of the externally biased magnetic field, the direction of the perpendicular magnetization is switched, e.g., from upwardly facing (=digital logic 1 or 0) to downwardly facing (=digital logic 0 or 1, respectively) or vice versa, so as to be aligned with that of the external magnetic field. At the end of a write pulse (i.e., laser pulse), the temperature of the heated recording domain then decreases and eventually returns to room temperature by cessation of the laser beam irradiation thereof. Since the alignment direction of magnetization of the recording media effected by the laser pulse heating to above the Curie temperature is maintained at the lowered temperature, desired information can thus be recorded in the magneto-optical media.

For reading the information stored in the MO media according to the above-described method, the recorded portions of the media are irradiated with a second, linearly polarized laser beam of lower power or intensity than the one used for recording, and light reflected or transmitted from the recorded portions is detected, as by a suitable detector/sensor means. The recorded information is read out by detecting the Kerr rotation angle of the polarization plane of light reflected from the recording layer or the Faraday rotation angle of the polarization plane of light transmitted through the recording layer. More particularly, since the rotation angle of the polarization plane varies depending upon the direction of magnetization of the recorded portions of the media according to the Kerr or Faraday effect, information stored within the media can be read out optically by a differential detector which decodes the polarization-modulated light beam into bits of information.

Conventional MO recording technology typically utilizes a transparent substrate and the polarized, lower intensity laser beam is transmitted through the recording medium layers for reception by the detector/sensor means for measurement of the rotation angle of the transmitted polarized light via the Faraday effect, as explained supra. However, in high density, multilayer, magneto-optical (HDMMO) recording systems, polarized, lower intensity laser beam light is reflected from a multilayer, superlattice-based MO medium for measurement of the amount of rotation of the plane of the polarized laser light via the Kerr effect, again employing a suitable detector/sensor means, wherein the superlattice provides a greater angle of rotation of polarized light of specific wavelengths, e.g., blue light, than that obtainable with conventional RE-TM materials, e.g., TbFeCo. The HDMMO type system is further advantageous in that, inter alia, opaque substrate materials, e.g., polymers, can be utilized, and dual-sided media are readily fabricated.

In addition to the abovementioned advantages, HDMMO-type media can readily utilize such less expensive polymeric substrates with a pre-formatted servo pattern easily formed on the surface thereof by a masking and injection molding process, thereby not requiring electronic servo as in conventional hard disk drive technology. Further in addition, the direct irradiation of the MO layer(s) via the front side of the medium also results in several other advantages vis-à-vis through-the-substrate illumination, e.g., HDMMO-type systems can utilize head sliders flying over the disk surface by forming the optical and magnetic components integral with the slider, whereby the laser beam is irradiated through the slider body and directly focussed on the HDMO read-write layer. However, conventional overcoat layers and materials, e.g., sputtered $SiN_x$ films, are brittle and exhibit poor reliability during head loading, i.e., frequent head crashing, when utilized in HDMMO-type systems, as explained in more detail below.

Such HDMMO-type recording media, when fabricated in disk form for rotation about a central axis, can be adapted for use in conventional Winchester, or hard drive, devices as are employed with conventional magnetic recording media. Hard drives typically employed for such disk-shaped media utilize flying heads for mounting transducer/sensor devices, etc., thereon, for close positioning thereof adjacent the surface of the recording media. In operation, a typical contact start/stop (CSS) method commences when a data transducing head begins to slide against the surface of the disk as the disk begins to rotate. Upon reaching a predetermined high rotational speed, the head floats in air at a predetermined small distance from the surface of the disk, where it is maintained during reading and recording operations. Upon terminating operation of the disk drive, the head again begins to slide against the surface of the disk and eventually stops in contact with and pressing against the disk. Therefore, as in the case of magnetic disks, a protective overcoat layer and a lubricant topcoat layer are typically applied to the disk surface for minimizing scratching and abrasion of the sensor/transducer head and the recording media surface, which can result in an undesirably high wear rate of the head and recording media surface.

However, in the case of portable MO recording devices, the use of a lubricating oil, e.g., a fluorocarbon-based oil, is problematic in that it is difficult to maintain the lubricating oil on the surface of the MO media, thereby increasing surface scratching and wear. In addition, MO disks produced without lubricating oil on their surface by some manufacturers are not necessarily compatible with similar media produced with lubricating oil by other manufacturers.

In another approach for minimizing abrasion, scratching, and wear of transducer heads, a solid lubricant is applied to the bottom surface of the flying head which comes into contact with the surface of the MO recording medium. However, such solid lubricant applied to the bottom surface of the flying head must have a durability many times greater than lubricant applied to the MO recording medium. As a consequence, application of solid lubricant only to the flying head is not sufficient for adequately reducing abrasion, scratching, and wear.

An additional difficulty encountered in the development of wear-resistant, lubricated HDMMO-type recording media and Winchester-type drives therefor, is the requirement imposed by the impetus for achieving ever-higher density recording, which necessitates further reduction in the disk-transducer/sensor spacing. The head-to-disk interface (HDI) becomes very critical as head-disk spacing is reduced and head fly height decreases. HDMMO-type media with conventional protective overcoat and lubricant layers, such as sputtered $SiN_x$ layers, have extremely poor tribological performance, resulting in lack of reliability of MO-based disk drives.

The above-described problems, including disk crashing during head loading, associated with the requirement for reduced head-disk spacing and fly height, are further exacerbated in the case of HDMMO-type media, wherein the optical and magnetic components of the recording system are incorporated into the head slider.

Thus, there exists a need for a protective overcoat or protective overcoat/lubricant topcoat layer system which enables the manufacture of reliable, high recording density single- and dual-sided HDMMO-type disk devices, which layer system effectively eliminates the problems and drawbacks associated with the conventional technology, i.e., scratching, abrasion, brittleness, increased wear of transducer/sensor head and recording media surfaces, and tendency for crashing during head loading.

The present invention addresses and solves the problems attendant upon the use of high density, HDMMO-type disk-shaped recording media and hard drives, while maintaining full compatibility with all mechanical aspects of conventional disk drive technology.

DISCLOSURE OF THE INVENTION

An advantage of the present invention is a high density, HDMMO-type recording medium having improved tribological performance and long-term durability.

Another advantage of the present invention is a high density, HDMMO-type recording medium having an improved protective overcoat layer.

A further advantage of the present invention is a high density, HDMMO-type recording medium having an improved protective overcoat/lubricant topcoat layer system.

Yet another advantage of the present invention is a high density, HDMMO-type recording medium providing improved performance at decreased head-to-disk spacings.

Still another advantage of the present invention is single- and dual-sided, high density, HDMMO-type recording medium having protective overcoat layer/lubricant topcoat layer systems thereon providing improved tribological performance.

Additional advantages and other features of the present invention will be set forth in the description which follows and in part will become apparent to those having ordinary skill in the art upon examination of the following or may be learned from practice of the present invention. The advantages of the present invention may be realized and obtained as particularly pointed out in the appended claims.

According to one aspect of the present invention, the foregoing and other advantages are obtained in part by a high density, multilayer, magneto-optical (HDMMO) storage medium including at least one laminate of layers comprising, in sequence from at least one surface of a substrate: a high density, magneto-optical (HDMO) read-write layer comprising a metal superlattice; a dielectric layer which is substantially transparent to the wavelength(s) of at least one laser beam used for writing and reading out information stored in the medium; and an ultra-thin, amorphous, abrasion-resistant, carbon-based protective flash layer overcoat (FLO) over the substantially transparent dielectric layer.

According to embodiments of the present invention, the amorphous, abrasion-resistant, FLO layer has a thickness not greater than about 10 Å thick, e.g., from about 5 to about 10 Å, and comprises a diamond-like material selected from a-$CN_x$, a-$CH_x$, and a-$CN_xH_y$; the laminate further comprises a lubricant topcoat layer on the protective overcoat layer, the lubricant topcoat layer comprising a fluoropolyether or a perfluoropolyether lubricant material and having a thickness of from about 15 to about 25 Å.

According to further embodiments of the present invention, the substrate includes a pair of opposed major surfaces and comprises a material selected from the group consisting of: polymers, metals, glass, and ceramics; the laminate of layers comprises a stack of layers formed on one of the pair of opposed major surfaces, the layer stack comprising, in overlying sequence from the substrate:

(a) a precious metal or metal alloy layer formed on one of the pair of opposed major surfaces of the substrate;

(b) an HDMO read-write layer comprising a $(Co/M)_n$ superlattice, where Co=cobalt, M=a precious metal, and n=about 10 to about 30, the HDMO read-write layer having large perpendicular anisotropy and high coercivity, high squareness ratio (S) for a magnetic hysteresis (M-H) loop measured in the perpendicular direction, and high Kerr rotation angle for red, blue, etc. light;

(c) a dielectric layer comprising a material which is substantially transparent to the at least one laser beam wavelength; and the FLO layer is formed on the substantially transparent dielectric layer and the lubricant topcoat layer is formed over the FLO layer.

According to embodiments of the present invention:
the precious metal or metal alloy layer (a) comprises an about 100 Å to about 300 Å thick layer of a metal material selected from the group consisting of platinum (Pt), palladium (Pd), and alloys thereof;
the HDMO read-write layer (b) comprises a $(Co/Pt)_n$, or a $(Co/Pd)_n$ superlattice wherein the thickness of each of the Co layers is from about 3 Å to about 5 Å, the thickness of each of the Pt and Pd layers is from about 7 Å to about 10 Å, the perpendicular anisotropy exceeds about $2 \times 10^6$ erg/cm$^3$, the coercivity is as high as about 5,000 Oe, the squareness ratio of the M-H loop measured in the perpendicular direction is from about 0.85 to about 1.0, and the carrier-to-noise ratio (CNR) is from about 30 to about 60 dB; and
the substantially transparent dielectric layer (c) comprises an about 200 Å to about 1000 Å thick layer of a material selected from the group consisting of: $SiN_x$, $AlN_x$, $SiO_x$, and $AlO_x$.

In a further embodiment according to the present invention, the medium comprises another layer stack, identical to the above-described layer stack, formed on the other one of the pair of opposed major surfaces of the substrate.

According to another aspect of the present invention, a high density, multilayer, magneto-optical (HDMMO) storage medium includes at least one laminate of layers comprising, in sequence from at least one surface of a substrate: a precious metal or metal alloy layer; an HDMO read-write layer comprising a metal superlattice; a dielectric layer which is substantially transparent to the wavelength(s) of at least one laser beam used for writing and reading-out information stored in the medium; an ultra-thin, amorphous, abrasion-resistant, carbon-based, protective flash layer overcoat (FLO) over the substantially transparent dielectric layer, the FLO layer having a thickness not greater than about 10 Å and comprising a diamond-like material selected from the group consisting of: a-CN, a-CH$_x$, and a-CN$_x$H$_y$; and a thin lubricant topcoat layer having a thickness of from about 15 to about 25 Å on the FLO layer, the lubricant topcoat layer comprising a fluoropolyether polymer material or a perfluoropolyether polymer material.

According to yet another aspect of the present invention, a high density, multilayer, magneto-optical (HDMMO) storage medium includes:

a substrate; and means for protecting the exterior surface of the medium.

Additional advantages of the present invention will become readily apparent to those skilled in the art from the following detailed description, wherein only preferred embodiments of the invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not as limitative.

BRIEF DESCRIPTION OF THE DRAWINGS

The following detailed description of the embodiments of the present invention can best be understood when read in conjunction with the following drawings, in which like reference numerals are employed throughout to designate similar features, wherein.

Figure 1:
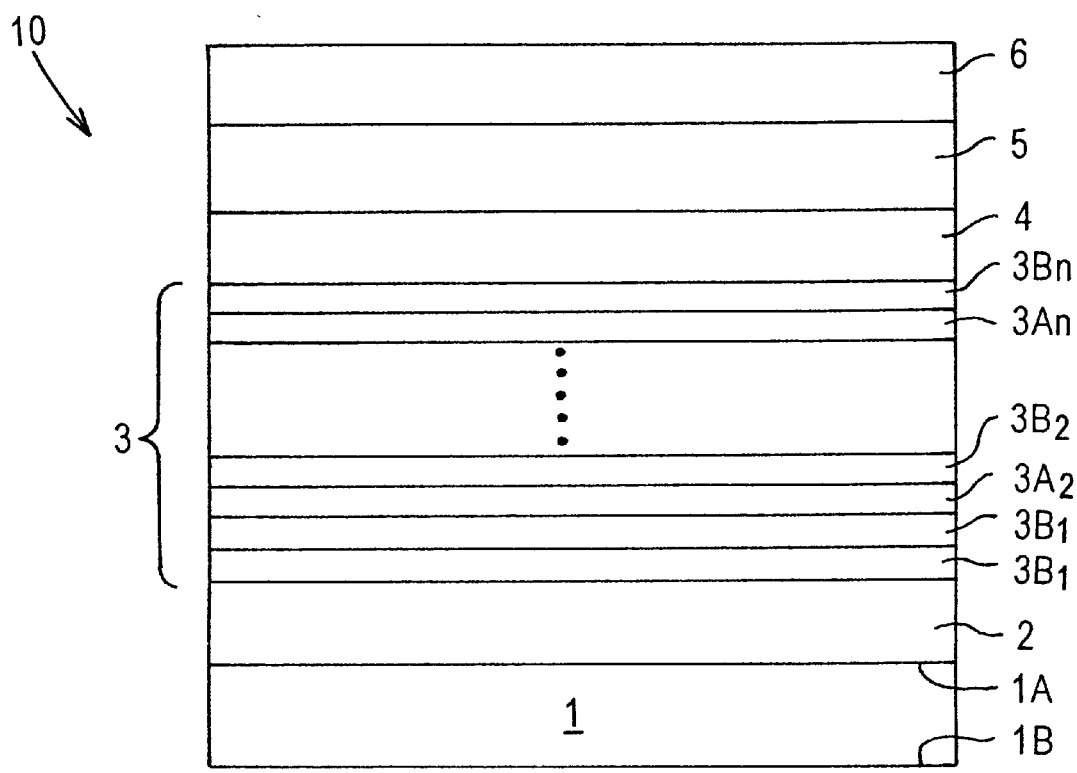
FIG. 1 illustrates, in simplified, cross-sectional schematic form, an HDMMO medium according to a single-sided embodiment according to the present invention.

It should be recognized that the various layers forming the layer stacks or laminates illustrated in the appended figures as representing cross-sections of portions of HDMMO media fabricated according to the inventive methodology are not drawn to scale, but instead are drawn as to best illustrate the features of the present invention.

DESCRIPTION OF THE INVENTION

The present invention is based on the discovery that an ultra-thin, "flash-layer" protective overcoat ("FLO") and FLO protective overcoat/lubricant topcoat layer system comprised of specific materials can provide optimal tribological performance of high density, multilayer, magneto-optical (HDMMO) media, such as disks, with minimal lubricant topcoat layer thicknesses and head-to-disk spacings (i.e., flying heights) less than about 2 micro-inches ($\mu$in) for media having polymeric substrates; less than about 1 $\mu$in. for media having metal, glass, or ceramic substrates; and less than about 0.5 $\mu$in. for media having glass, glass-ceramic, or ceramic substrates with surface roughness Ra in the range of from about 2 Å to about 3 Å. More specifically, according to the present invention, an ultra-thin FLO layer comprising an amorphous, hard, carbon-based, abrasion-resistant protective material, e.g., a carbon-based diamond-like material such as a-CN$_x$ (where x=0.05–0.30), a-CH$_x$ (where x=0.20–0.30), and a-CN$_x$H$_y$ (where x=0.03–0.10 and y=0.15–0.30), is formed to cover the substantially transparent dielectric layer ("foundation layer"), typically of a SiN$_x$ material, formed over the superlattice-based HDMO write and read-out layer of such HDMMO-type media. The ultra-thin amorphous, diamond-like FLO layer has a thickness not greater than about 10 Å, e.g., about 5 Å to about 10 Å, and therefore functions solely as a protective layer, i.e., it does not absorb any of the laser beam energy utilized for writing and reading-out information. The FLO layer can be formed by any of the physical vapor deposition (PVD) or chemical vapor deposition (CVD) methods conventionally employed for depositing such type layers. By way of illustration, but not limitation, a-CH$_x$ layers may be deposited on suitable dielectrically coated MO media substrates by AC sputtering of a 3 inch by 15 inch graphite target at frequencies in the range of 40–400 KHz at a power in the range of 0.5–2 KW in an atmosphere of 15% H$_2$/85% Ar. Similar conditions may be employed for forming a-CN$_x$ and a-CN$_x$H$_y$ coatings by use of N$_2$ and H$_2$—N$_2$ mixtures, respectively. Given the present disclosure and the objectives of the invention, determination and selection of the parameters necessary for obtaining equivalently performing diamond-like amorphous carbon-containing FLO layers and coatings by other conventional film-forming techniques is considered within the ambit of the artisan for use in a particular situation.

The lubricant topcoat layer formed over the protective overcoat layer, in embodiments according to the present invention, comprises fluoropolyether or perfluoropolyether polymer materials such as, for example, perfluoropolyethylene (PFPE), and like materials available under the tradenames Fomblin ZDol, Fomblin AM2001, and Fomblin Z-Dol TX from Ausimont, Thorofare, N.J., and has a thickness not greater than about 25 Å, e.g., from about 10 Å to about 25 Å.

The lubricant topcoat layer can be applied in any conventional manner, as by dipping in a dilute solution of the lubricant in a suitable solvent, e.g., a hydrofluorocarbon, or by spraying, etc. By way of example, but not limitation, the above enumerated lubricants can be applied to the disk surface by such dipping process utilizing a lubricant concentration of about 0.2 to about 0.3 wt. %. The bonded lubricant ratio may be enhanced by performing a post dipping processing, e.g., thermal or UV curing, as is known in the art. In addition, the post-lubricated surface may be subjected to a buffing or "tape burnishing" process and/or wiping to enhance glide height yield and reduce the amount of surface particulate matter. In utilizing the above-described dip coating process, it is desirable that the surface of the disk be preliminarily treated to be free of impurities so that good bonding can occur between the functional end groups of the lubricant polymer molecules and the substrate surface (i.e., the FLO layer). The bonding of the lubricant to the surface of the disk can be further enhanced by cleaning the surface of the protective overcoat layer with a mild plasma or a solvent rinse prior to applying the lubricant.

By way of illustration, but not limitation, high recording density, HDMMO-configured media provided with a 5–10 Å thick amorphous, carbon-based, diamond-like FLO layer selected from a-$CH_x$, a-$CN_x$, and a-$CN_xH_y$ and coated with about 15–25 Å thick lubricant topcoat layers of Fomblin Zdol and Fomblin AM2001, provided excellent tribological and stiction properties at reduced fly heights of from about 0.5 μin. to about 2 μin. for media having metal, glass, or ceramic substrates with surface roughness Ra in the range of from about 2 Å to about 3 Å; from about 0.7 μin. to about 2 μin. for media having metal, glass, or ceramic substrates with surface roughness Ra in the range of from about 3 Å to about 7 Å; and from about 2 μin. to about 5 μin. for media having polymeric substrates.

An embodiment of the present invention comprises a single-sided, high recording density, multilayer, magneto-optical (HDMMO) medium 10 employing the inventive flash layer protective overcoat (FLO) and FLO/lubricant topcoat layer system and is illustrated in FIG. 1, wherein reference numeral 1 denotes a substrate comprising a pair of major opposed surfaces 1A and 1B. The material of the substrate is not critical for the practice of the invention, and may be selected from polymers, metals, glass, and ceramics. The substrate material per se may be transparent or opaque. However, in the former case, at least one opaque substrate surface can be provided by forming thereon a suitable non-transmissive coating or layer, e.g., paint, metal, polymer, etc. The thickness of substrate 1 is also not critical, but must provide adequate rigidity during rotation and static periods.

Formed on a first, one (1A) of the opposing major surfaces of substrate 1 is a layer stack, comprising, in overlying sequence from substrate surface 1A: (a) a precious metal or metal alloy layer 2 about 100–300 Å thick, typically comprising platinum (Pt), palladium (Pd), or an alloy thereof, which layer may, if desired, serve to prevent laser beam transmission through the substrate 1 and thus render surface 1A opaque (a thin $SiN_x$ or $AlN_x$ seed layer can be optionally provided between the substrate surface 1A and precious metal or metal alloy layer 2 for preventing oxidation, contamination, etc., of the latter by oxygen and/or water vapor contained in the former); (b) a metal superlattice high density magneto-optical (HDMO) read-write layer 3 comprising a stacked series of n pairs (3A/3B) of very thin metal layers, e.g., n cobalt (Co)/precious metal (M) layer pairs, where n=about 10 to about 30. By way of example, but not limitation, suitable superlattice layer pair stacks may comprise alternating thin layers of Co (3A) and Pt (3B) or Co (3A) and Pd (3B), i.e., $(Co/Pt)_n$ and $(Co/Pd)_n$, wherein the thickness of each of the Co layers is from about 3 Å to about 5 Å and the thickness of each of the Pt and Pd layers is from about 7 Å to about 10 Å. Metal superlattices such as are contemplated for use herein as high density magneto-optical (HDMO) read-write layers are characterized by having a large perpendicular anisotropy and high coercivity, high squareness ratio (S) for a magnetic hysteresis (M-H) loop measured in the perpendicular direction, and high Kerr rotation angle for light of a particular wavelength region, e.g., blue or red light. By way of illustration but not limitation, $(Co/Pt)_n$ and $(Co/Pd)_n$ HDMO superlattices, where n=about 10 to about 30 pairs of Co and Pt or Pd layers of thickness as indicated supra and fabricated, e.g., by means of techniques as disclosed in U.S. Pat. No. 5,750,270, the entire disclosure of which is incorporated herein by reference, exhibit perpendicular anisotropy exceeding about $2 \times 10^6$ erg/$cm^3$, coercivity as high as about 5,000 Oe, squareness ratio (S) of an M-H loop measured in the perpendicular direction of from about 0.85 to about 1.0, and carrier-to-noise ratio (CNR) of from about 30 dB to about 60 dB; (c) a "foundation" layer 4 from about 200 Å to about 1000 Å thick and comprising a dielectric material which is substantially transparent to the wavelength(s) of the at least one laser beam employed for writing and reading out information, typically selected from $SiN_x$ (where x=ca. 0.8–1.33), $AlN_x$ (where x=ca. 1–1.5), $SiO_x$ (where x=ca. 1–2.0), and $AlO_x$ (where x=ca. 1–1.5); (d) an ultra-thin, amorphous, diamond-like, protective flash overcoat layer (FLO) 5 not greater than about 10 Å thick, typically from about 5 Å to about 10 Å thick and comprising a material formed as described supra, i.e., a-$CN_x$ (where x=0.05–0.30), a-$CH_x$ (where x=0.20–0.30), or a-$CNH_y$ (where x=0.03–0.10 and y=0.15–0.30); and (e) a lubricant topcoat layer 6 having a thickness of from about 15 Å to about 25 Å and comprised of a fluoropolyether or perfluoropolyether polymer material, e.g., perfluoropolyethylene (PFPE).

Figure 2:
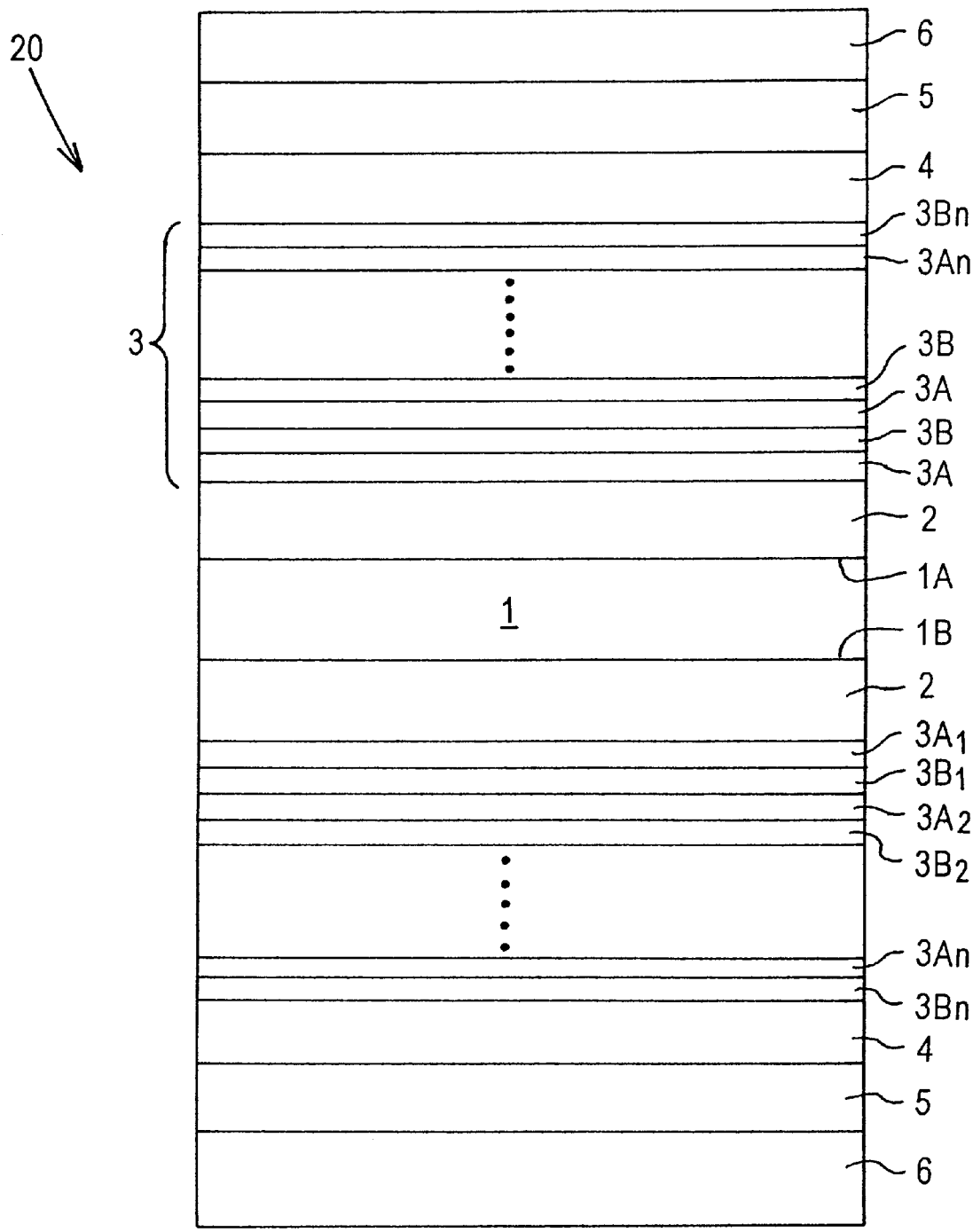
FIG. 2 illustrates, in simplified, cross-sectional schematic form, an HDMMO medium according to a dual-sided embodiment according to the present invention.

FIG. 2 illustrates a dual-sided embodiment of the present invention corresponding to the single-sided embodiment shown in FIG. 1 and described above. Such dual-sided media advantageously may be operated to record and read out information from both sides of a common substrate, and thus are useful for increasing storage density. As for the dual-sided embodiment of FIG. 2, medium 20 comprises a second layer stack formed on the second, major surface 1B of substrate 1, in opposing relation to the first layer stack formed on the first opaque, major surface 1A, with both layer stacks being identically constituted as shown in FIG. 1.

Conventional techniques, such as PVD and/or CVD may be employed for depositing each of the seed, precious metal, superlattice HDMO read-write, and ultra-thin FLO layers of the layer stacks of the above-described embodiments, with sputtering generally being preferred. The lubricant topcoat layer is readily deposited by conventional dipping techniques, as indicated above. Therefore, details of the deposition techniques utilized for forming each of the layers of the layer stack are generally omitted from the present disclosure for brevity and in order not to unnecessarily obscure the present invention.

Thus, the present invention advantageously provides, as by the use of conventional processing techniques, high quality, high density, multi-layer, magneto-optical (HDMMO) information storage and retrieval media having novel, ultra-thin, abrasion-resistant, carbon-based, flash layer protective overcoats (FLO) imparting improved tribological properties thereto and therefore suitable for use in high density storage devices requiring minimal head fly height.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A high density, multilayer, magneto-optical (HDMMO) storage medium including at least one laminate of layers comprising, in sequence from at least one surface of a substrate:

a precious metal or metal alloy layer;

a high density, magneto-optical (HDMO), read-write layer comprising a metal superlattice;

a dielectric layer which is substantially transparent to the wavelength(s) of at least one laser beam used for writing and reading out information stored in said medium; and an amorphous, abrasion-resistant, carbon-based, protective flash layer overcoat (FLO) over said substantially transparent dielectric layer.

2. The medium according to claim 1, wherein said FLO layer comprises a material selected from the group consisting of: a-$CN_x$, where x=0.05–0.30; a-$CH_x$, where x=0.20–0.30; and a-$CN_xH_y$, where x=0.03–0.10 and y=0.15–0.30.

3. The medium according to claim 2, wherein said FLO layer has a thickness not greater than about 10 Å.

4. The medium according to claim 2, wherein said FLO layer has a thickness of from about 5 Å to about 10 Å.

5. The medium according to claim 1, wherein said laminate further comprises a lubricant topcoat layer on said FLO layer.

6. The medium according to claim 5, wherein said lubricant topcoat layer comprises a fluoropolyether or perfluoropolyether lubricant material.

7. The medium according to claim 6, wherein said lubricant topcoat layer has a thickness of from about 15 Å to about 25 Å.

8. The medium according to claim 1, wherein said substrate includes a pair of opposed major surfaces and comprises a material selected from the group consisting of: polymers, metals, glass, and ceramics.

9. The medium according to claim 8, wherein said laminate of layers comprises a stack of layers formed on one of said pair of opposed major surfaces, said layer stack comprising, in overlying sequence from said substrate:

(a) a precious metal or metal alloy layer formed on one of said pair of opposed major surfaces of said substrate;

(b) an HDMO read-write layer comprising a $(Co/M)_n$ superlattice, where Co=cobalt, M=a precious metal, and n=about 10 to about 30, said HDMO read-write layer having large perpendicular anisotropy and high coercivity, high squareness ratio (S) for a magnetic hysteresis (M-H) loop measured in the perpendicular direction, and high Kerr rotation angle for blue light;

(c) a dielectric layer comprising a material which is substantially transparent to said at least one laser beam wavelength; and said FLO layer is formed on said substantially transparent dielectric layer.

10. The medium according to claim 9, further comprising a lubricant topcoat layer over said FLO layer.

11. The medium according to claim 9, wherein:

said precious metal or metal alloy layer (a) comprises a metal material selected from the group consisting of platinum (Pt), palladium (Pd), and alloys thereof;

said HDMO read-write layer (b) comprises a $(Co/Pt)_n$ or a $(Co/Pd)_n$ superlattice; and said substantially transparent dielectric layer (c) comprises a material selected from the group consisting of: $SiN_x$, where x=ca. 0.8–1.33; $AlN_x$, where x=ca. 1–1.5; $SiO_x$, where x=ca. 1–2.0; and $AlO_x$, where x=ca. 1–1.5.

12. The medium according to claim 11, wherein:

the thickness of said precious metal or metal alloy layer (a) is from about 100 Å to about 300 Å;

the thickness of each of the Co layers of said superlattice HDMO read-write layer (b) is from about 3 Å to about 5 Å, the thickness of each of said Pt or Pd layers is from about 7 Å to about 10 Å, the perpendicular anisotropy exceeds about $2 \times 10^6$ erg/cm$^3$, the coercivity is as high as about 5,000 Oe, the squareness ratio (S) of the M-H loop measured in the perpendicular direction is from about 0.85 to about 1.0, and the carrier-to-noise ratio (CNR) is from about 30 db to about 60 dB; and the thickness of the substantially transparent dielectric layer (c) is from about 200 Å to about 1000 Å for laser light in the blue to red wavelength region.

13. The medium according to claim 9, comprising another layer stack, identical to the abovesaid layer stack, formed on the other one of said pair of opposed major surfaces of said substrate.

14. A high density, multilayer, magneto-optical (HDMMO) storage medium including at least one laminate of layers comprising, in sequence from at least one surface of a substrate:

a precious metal or metal alloy layer;

a high density, magneto-optical (HDMO), read-write layer comprising a metal superlattice;

a dielectric layer which is substantially transparent to the wavelength(s) of at least one laser beam used for writing and reading-out information stored in said medium;

an amorphous, abrasion-resistant, carbon-based, protective flash layer overcoat (FLO) over said substantially transparent dielectric layer, said FLO layer having a thickness not greater than about 10 Å and comprising a diamond-like material selected from the group consisting of: a-$CN_x$, where x=0.05–0.30; a-$CH_x$, where x=0.20–0.30; and a-$CN_xH_y$, where x=0.03–0.10 and y=0.15–0.30; and a thin lubricant topcoat layer having a thickness of from about 15 Å to about 25 Å on said FLO layer, said thin lubricant topcoat layer comprising a fluoropolyether polymer material or a perfluoropolyether polymer material.

15. The medium according to claim 14, wherein said substrate includes a pair of opposed major surfaces and comprises a material selected from the group consisting of: polymers, metals, glass, and ceramics.

16. The medium according to claim 15, wherein said laminate of layers comprises a stack of layers formed on one of said pair of opposed major surfaces, said layer stack comprising, in overlying sequence from said substrate:

(a) a precious metal or metal alloy layer formed on said one of said pair of opposed major surfaces of said substrate and comprising a metal material selected from the group consisting of platinum (Pt), palladium (Pd), and alloys thereof;

(b) an HDMO read-write layer comprising a $(Co/Pt)_n$ or a $(Co/Pd)_n$ superlattice, wherein Co=cobalt and n=about 10 to about 30, said HDMO read-write layer having a large perpendicular anisotropy and high coercivity, high squareness ratio (S) for a magnetic hysteresis (M-H) loop measured in the perpendicular direction, and high Kerr rotation angle for blue light;

(c) a dielectric layer comprising a material which is substantially transparent to said at least one laser beam wavelength, selected from the group consisting of: $SiN_x$, where x=ca. 0.8–1.33; $AlN_x$, where x=ca. 1–1.5; $SiO_x$, where x=ca. 1–2.0; and $AlO_x$ where x=ca. 1–1.5; and said FLO layer is formed on said substantially transparent dielectric layer and said thin lubricant topcoat layer is formed on said FLO layer.

17. The medium according to claim 16, wherein:

the thickness of said precious metal or metal alloy layer (a) is from about 100 Å to about 300 Å;

the thickness of each of the Co layers of said superlattice HDMO read-write layer (b) is from about 3 Å to about 5 Å, the thickness of each of said Pt and Pd layers is from about 7 Å to about 10 Å, the perpendicular anisotropy exceeds about $2\times10^6$ erg/cm$^3$, the coercivity is as high as about 5,000 Oe, the squareness ratio (S) of the M-H loop measured in the perpendicular direction is from about 0.85 to about 1.0, and the carrier-to-noise ratio (CNR) is from about 30 dB to about 60 dB; and the thickness of the substantially transparent dielectric layer (c) is from about 200 Å to about 1000 Å for laser light in the blue to red wavelength region.

18. The medium according to claim 17, comprising another layer stack, identical to the abovesaid layer stack, formed on the other one of said pair of opposed major surfaces of said substrate.

19. A high density, multilayer, magneto-optical (HDMMO) storage medium including:

a substrate; and means for protecting the exterior surface of said medium.

* * * * *